United States Patent
Stojanovski et al.

(10) Patent No.: US 9,756,497 B2
(45) Date of Patent: Sep. 5, 2017

(54) PATH SWITCHING PROCEDURE FOR DEVICE-TO-DEVICE COMMUNICATION

(71) Applicants: Alexandre Stojanovski, Paris (FR); Muthaiah Venkatachalam, Beaverton, OR (US); Kerstin Johnsson, Palo Alto, CA (US)

(72) Inventors: Alexandre Stojanovski, Paris (FR); Muthaiah Venkatachalam, Beaverton, OR (US); Kerstin Johnsson, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 84 days.

(21) Appl. No.: 14/762,764

(22) PCT Filed: Dec. 13, 2013

(86) PCT No.: PCT/US2013/074867
§ 371 (c)(1),
(2) Date: Jul. 22, 2015

(87) PCT Pub. No.: WO2014/130143
PCT Pub. Date: Aug. 28, 2014

(65) Prior Publication Data
US 2015/0359033 A1 Dec. 10, 2015

Related U.S. Application Data

(60) Provisional application No. 61/768,330, filed on Feb. 22, 2013.

(51) Int. Cl.
*H04W 4/00* (2009.01)
*H04W 8/00* (2009.01)
(Continued)

(52) U.S. Cl.
CPC .......... *H04W 8/005* (2013.01); *H04L 12/4633* (2013.01); *H04L 27/2614* (2013.01);
(Continued)

(58) Field of Classification Search
CPC . H04W 48/16; H04W 48/08; H04W 28/0289; H04W 28/12; H04W 52/028;
(Continued)

(56) References Cited

U.S. PATENT DOCUMENTS

| 2006/0062220 A1 | 3/2006 | Suga |
| 2007/0019631 A1 | 1/2007 | Jang |

(Continued)

FOREIGN PATENT DOCUMENTS

CN 101964826 A 2/2011

OTHER PUBLICATIONS

International Search Report and Written Opinion for PCT/US2013/074867 dated Dec. 13, 2013.
(Continued)

*Primary Examiner* — Clemence Han
(74) *Attorney, Agent, or Firm* — Ledell Ansari, LLP

(57) ABSTRACT

Session continuity may be maintained when communication devices transition from communicating through network infrastructure (e.g., through a cellular network) to direct mode communications (e.g., a communication path directly between two communication devices). For example, in switching from an infrastructure mode communication path to a direct mode communication path, a method may include: determining a public-facing address corresponding to the infrastructure path; replacing, for a packet that is to be transmitted over the direct mode communication path to a second communication device, a source address field of the packet with the determined public-facing address; and encapsulating the packet with source and destination address
(Continued)

fields corresponding to the first and second communication device through the direct mode communication path respectively.

24 Claims, 10 Drawing Sheets

(51) Int. Cl.
| | | |
|---|---|---|
| H04W 72/04 | (2009.01) |
| H04W 74/02 | (2009.01) |
| H04W 76/02 | (2009.01) |
| H04W 72/00 | (2009.01) |
| H04W 76/04 | (2009.01) |
| H04L 12/46 | (2006.01) |
| H04L 29/12 | (2006.01) |
| H04W 28/02 | (2009.01) |
| H04W 40/02 | (2009.01) |
| H04W 48/18 | (2009.01) |
| H04W 24/06 | (2009.01) |
| H04W 74/00 | (2009.01) |
| H04W 74/04 | (2009.01) |
| H04W 74/08 | (2009.01) |
| H04W 36/00 | (2009.01) |
| H04W 36/30 | (2009.01) |
| H04L 27/26 | (2006.01) |
| H04W 40/24 | (2009.01) |
| H04W 24/02 | (2009.01) |
| H04W 48/14 | (2009.01) |
| H04W 52/02 | (2009.01) |
| H04W 28/12 | (2009.01) |
| H04L 12/801 | (2013.01) |
| H04W 48/08 | (2009.01) |
| H04W 48/16 | (2009.01) |
| H04W 88/06 | (2009.01) |
| H04L 12/725 | (2013.01) |
| H04W 28/08 | (2009.01) |
| H04W 84/12 | (2009.01) |

(52) U.S. Cl.
CPC ........... *H04L 47/11* (2013.01); *H04L 47/12* (2013.01); *H04L 61/2514* (2013.01); *H04L 61/2525* (2013.01); *H04L 61/2539* (2013.01); *H04L 61/2564* (2013.01); *H04L 61/2575* (2013.01); *H04L 61/2592* (2013.01); *H04L 61/6077* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 28/12* (2013.01); *H04W 36/0088* (2013.01); *H04W 36/30* (2013.01); *H04W 40/02* (2013.01); *H04W 40/244* (2013.01); *H04W 48/08* (2013.01); *H04W 48/14* (2013.01); *H04W 48/16* (2013.01); *H04W 48/18* (2013.01); *H04W 52/028* (2013.01); *H04W 52/0216* (2013.01); *H04W 72/005* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 84/12* (2013.01); *H04W 88/06* (2013.01); *Y02B 60/50* (2013.01)

(58) Field of Classification Search
CPC . H04W 52/0216; H04W 48/14; H04W 4/005; H04W 24/02; H04W 40/244; H04W 36/0088; H04W 36/30; H04W 72/0446; H04W 74/08; H04W 74/002; H04W 74/04; H04W 4/008; H04W 76/043; H04W 72/005; H04W 76/023; H04W 24/06; H04W 8/005; H04W 48/18; H04W 40/02; H04W 28/02; H04W 74/02; H04W 72/0413; H04W 84/12; H04W 28/08; H04W 88/06; H04L 61/2514; H04L 61/2592; H04L 61/2564; H04L 61/2525; H04L 61/6077; H04L 61/2575; H04L 47/11; H04L 47/12; H04L 27/2614; H04L 12/4633; H04L 61/2539; H04L 45/30; Y02B 60/50

See application file for complete search history.

(56) References Cited

U.S. PATENT DOCUMENTS

| | | | |
|---|---|---|---|
| 2007/0171910 A1 | 7/2007 | Kumar | |
| 2009/0239522 A1 | 9/2009 | Rek | |
| 2010/0312902 A1 | 12/2010 | Chaturvedi et al. | |
| 2011/0026440 A1 | 2/2011 | Dunn et al. | |
| 2011/0058549 A1* | 3/2011 | Harel | H04L 47/2483 370/390 |
| 2011/0167165 A1* | 7/2011 | Bryan | G06F 9/541 709/230 |
| 2012/0011189 A1 | 1/2012 | Werner et al. | |
| 2012/0165060 A1 | 6/2012 | Klemettinen | |
| 2012/0284788 A1 | 11/2012 | Gutiérrez | |
| 2013/0288668 A1* | 10/2013 | Pragada | H04W 12/06 455/426.1 |
| 2013/0324114 A1* | 12/2013 | Raghothaman | H04W 76/023 455/426.1 |
| 2014/0101337 A1* | 4/2014 | Toth | H04L 67/12 709/244 |
| 2014/0160950 A1* | 6/2014 | Vasudevan | H04W 36/00 370/252 |
| 2015/0334754 A1* | 11/2015 | Lei | H04W 8/005 455/422.1 |

OTHER PUBLICATIONS

3GPP Organizational Partners; 3GPP TR 22.803, 3rd Generation Partnership Project, Technical Specification Group Services and Systems Aspects; Feasibility study for Proximity Services (ProSe) (Release 12); Jun. 2013; Available at http://www.3gpp.org.

3GPP Organizational Partners; 3GPP TS 22.468, 3rd Generation Partnership Project, Technical Specification Group Services and System Aspects; Group Communication System Enablers for LTE (GCSE_LTE) (Release 12); Jun. 2013; Available at http://www.3gpp.org.

Open Mobile Alliance; Push to Talk Over Cellular (PoC) Architecture; Aug. 2011; Available at http://www.openmobilealliance.org.

WiFi Alliance; Wi-Fi Certified Wi-Fi Direct, Personal, Portable Wi-Fi to Connect Devices Anywhere, Any Time; Oct. 2010; Available at http://www.wi-fi.org.

3GPP Organizational Partners; 3GPP TR 23.703, 3rd Generation Partnership Project, Technical Specification Group Services and System Aspects; Study on Architecture Enhancements to Support Proximity Services (ProSe) (Release 12); Apr. 2013; Available athttp://www.3gpp.org.

RFC 5389, Session Traversal Utilities for NAT (STUN). Oct. 2008. Available at http://ieft.org.

RFC 5766, Traversal Using Relays around NAT (TURN): Relay Extensions to Session Traversal Utilities for NAT (STUN). Apr. 2010. Available at http://ieft.org.

European Search Report for related European Application EP13876018 based on corresponding PCT Application PCT/US2013/074867 dated Aug. 12, 2016.

(56) References Cited

OTHER PUBLICATIONS

Office Action and Search Report received in corresponding CN Application 201380070483.6 dated Apr. 26, 2017.

* cited by examiner

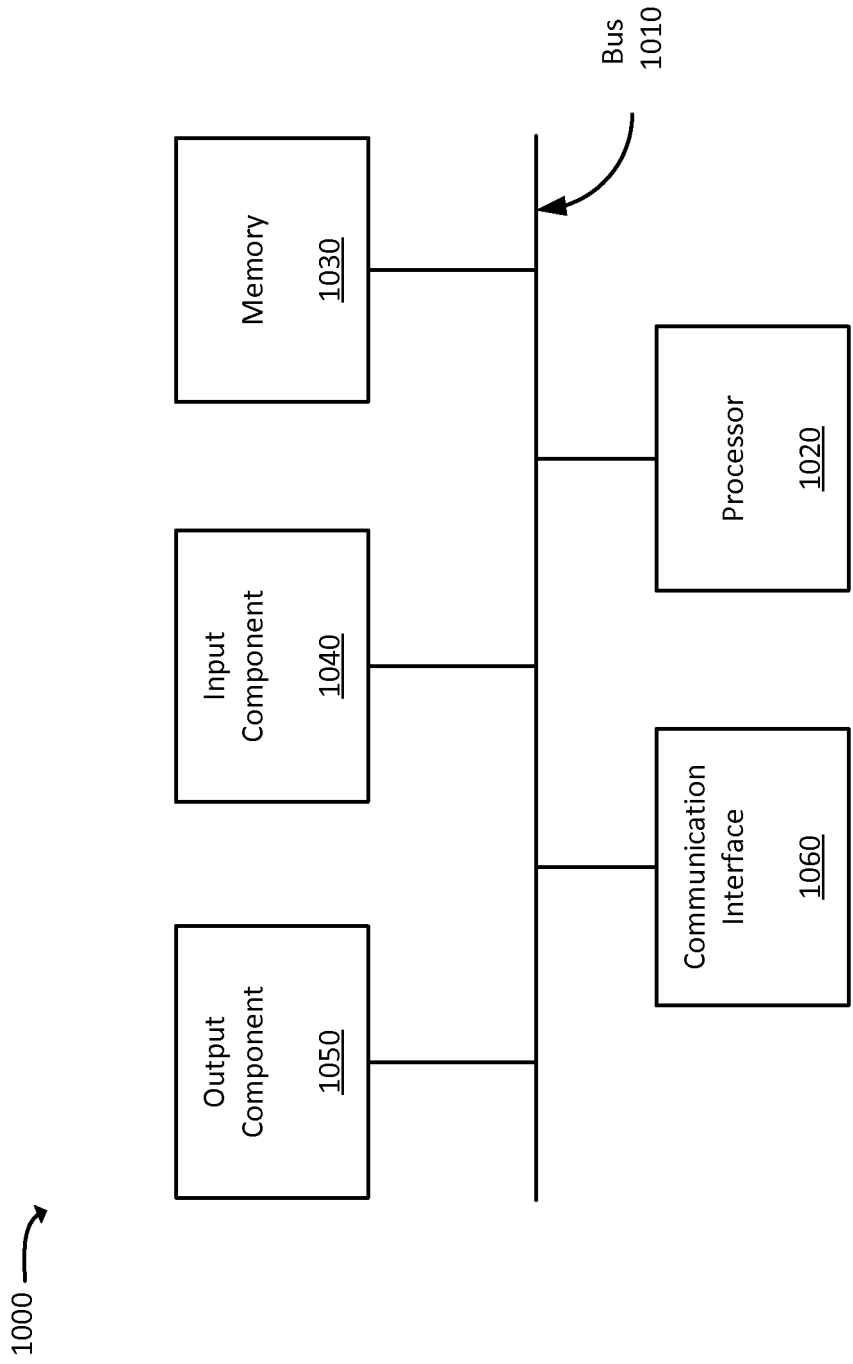

PATH SWITCHING PROCEDURE FOR DEVICE-TO-DEVICE COMMUNICATION

RELATED APPLICATIONS

The present application claims the benefit of U.S. Provisional Patent Application No. 61/768,330, which was filed on Feb. 22, 2013, and which is hereby incorporated by reference as though fully set forth herein.

BACKGROUND

Wireless networks may provide network connectivity to mobile communication devices, such as smart phones. The network connectivity may be provided through radio interfaces. Typically, the devices may connect to a network through an access point that is part of the network infrastructure. For example, a device may connect to a cellular network via a cellular base station or a wireless local area network (WLAN) via a WLAN access point (e.g., a WiFi access point).

Some techniques may allow devices to establish direct communication paths with one another (e.g., without going through a cellular base station or WiFi access point). For example, devices that are located in proximity to one another may discover one another and subsequently establish direct communication paths with one another. Examples of direct communication technologies include the WiFi Direct® standard or direct communications as discussed in the technical report "3GPP TR 22.703, Technical Specification Group Services and Systems Aspects; Study on architecture enhancements to support Proximity Services (ProSe) (Release 12)" (available at www.3gpp.org).

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 10 is a diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may provide for session continuity when communication devices, called "user equipment" (UE) herein, transition from communicating through network infrastructure (e.g., through a cellular network) to direct mode communications (e.g., a communication path directly between two UEs). For example, two UEs may be connected to a cellular network and may be implementing a communication application through the cellular network. The communication application may include an application to implement a voice call, a video call, a file transfer, etc. At some point during the operation of the communication application, the two UEs may establish direct mode communications, such as by a radio link that directly connects the two UEs without going through the infrastructure of the cellular network. It may be desirable, when switching to direct mode communications, to be able to continue to run the communication application without disruption. In other words, it may be desirable to switch the data flow, corresponding to the communication application, from the infrastructure path (e.g., through the cellular network) to the direct mode communication path, while maintaining session continuity at the application level. From the user's perspective, the switch between the infrastructure path and the direct mode communication path may not be noticeable (e.g., the voice call, video call, file transfer, etc. may continue uninterrupted).

Figure 1:
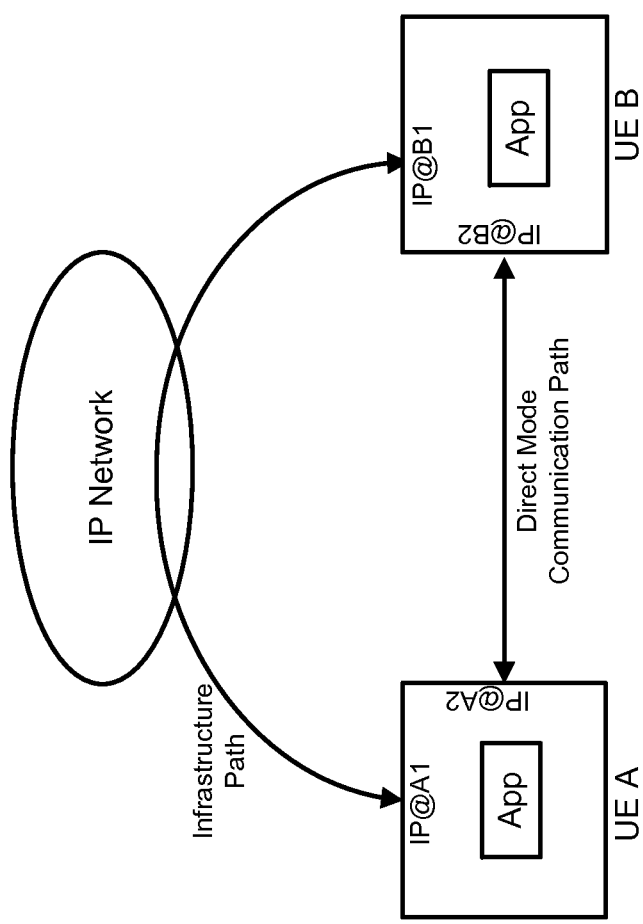
FIG. 1 is a diagram illustrating an example overview of one or more implementations described herein.

FIG. 1 is a diagram illustrating an example overview of one or more implementations described herein. As illustrated, two UEs, labeled as UE-A and UE-B, may be capable of communicating via an infrastructure path (e.g., through an Internet Protocol (IP) network) and via a direct path (direct mode communication). The infrastructure path may include a communication path in which the UEs wirelessly connect to the IP network, such as through cellular base stations. The direct mode communication may be based on the UEs directly communicating with one another. One technique for establishing direct communication paths between UEs is the WiFi Direct® standard (i.e., based on one of the Institute of Electrical and Electronics Engineers (IEEE) 802.11-based standards).

UE-A and UE-B may each execute an application ("App"). The application at UE-A may include a communication application (e.g., a voice, video, or file transfer application) that exchanges data with the application at UE-B. For example, the applications at UE-A and UE-B may be peer-to-peer video conference applications that allows the users of UE A and UE B to communicate with one another via a videoconference. Data for the videoconference may be streamed between UE A and UE B as an IP packet flow.

UE A, when first connecting to the IP network, may be assigned an IP address ("IP@A1"). Similarly, UE B, when first connecting to the IP network, may be assigned another IP address ("IP@B1"). UE-A and UE B may use different IP addresses when communicating using the direct mode communication ("IP@A2" and "IP@B2," respectively). As will be discussed more detail below, network address translation (NAT) may be performed by the IP network to assign yet another IP address to each of UE-A and UE-B. The IP addresses that are assigned by the IP network (e.g., IP@A1 and IP@B1) may be referred to as the "public-facing IP addresses" for UE A and UE B.

Consistent with aspects described herein, UE-A and UE-B may modify the headers of certain packets sent over the direct mode communication path so that, from the perspective of the application, packets received over the direct mode communication path may appear to be received from the same flow as packets received over the infrastructure path. Thus, the packet flow for a particular application, between UE A and UE B, may be switched from the infrastructure path to the direct mode communication path (or vice versa), without affecting the operation of the application. In this manner, session continuity (e.g., continuity of the voice application, video application, file transfer application) may be maintained across transitions between the infrastructure path and the direct mode communication path.

In one implementation, a method is disclosed for maintaining session continuity, for applications executing in a communication device, in switching from an infrastructure mode communication path to a direct mode communication path. The method may include determining a public-facing address corresponding to the infrastructure path of the communication device; and replacing, for a packet that is to be transmitted over the direct mode communication path to a second communication device, a source address field of the packet with the determined public-facing address. The method may further include encapsulating the packet with source and destination address fields corresponding to the first and second communication devices, respectively, through the direct mode communication path. The method may further include transmitting the encapsulated packet via the direct mode communication path.

The method may further include decapsulating packets received over the direct mode communication path from the second communication device, the decapsulation including replacing destination address fields of the packets with a private address of the communication device in the infrastructure path; and providing the decapsulated packets to an application layer of the communication device.

In an implementation, the source address field of the packet that is to be transmitted over the direct mode communication path may be initially created by the communication device as a private address corresponding to the infrastructure path of the communication device.

In an implementation, the replaced source address field of the packet includes a public-facing address that refers to a private address of the communication device in the infrastructure path.

In an implementation, the public-facing address and the source address each include an Internet Protocol (IP) address and a port number.

In an implementation, determining the public-facing address may include querying a Port Control Protocol (PCP) server, a Session Traversal Utilities for Network Address Translation (STUN) server, or a Traversal Using Relays around Network Address Translation (TURN) server.

In an implementation, the infrastructure mode communication path may include wireless communications based on Institute of Electrical and Electronics Engineers (IEEE) 802.11-based wireless communication standards.

In an implementation, the communications over the infrastructure mode communication path may include communications based on cellular wireless communication standards.

In another implementation, a communication device may maintain session continuity, for applications executing in a communication device, in switching from an infrastructure mode communication path to a direct mode communication path. The communication device may include processing circuitry to: determine a public-facing address corresponding to the infrastructure path of the communication device; and replace, by the communication device and for a packet that is to be transmitted over the direct mode communication path to a second communication device, a source address field of the packet with the determined public-facing address. The processing circuitry may further encapsulate the packet with source and destination address fields corresponding to the communication device and the second communication device, respectively, through the direct mode communication path; and transmit the encapsulated packet via the direct mode communication path.

In another implementation, a communication device may maintain session continuity, for applications executing in the communication device, in switching from a direct mode communication path to an infrastructure communication path. The communication device may including processing circuitry to: determine a public-facing address corresponding to the infrastructure path of the communication device; transmit, over the direct mode communication path and to a second communication device, the public-facing address; receive, over the infrastructure path, an encapsulated packet from the second communication device; decapsulate the received encapsulated packet to obtain a packet that includes addressing information corresponding to the direct mode communication path; and provide the decapsulated packet to an application layer of the communication device.

In another implementation, a UE may include a memory to store instructions; and at least one processor to execute the instructions stored by the memory to: connect with a second UE, using a communication session formed over an infrastructure path; and switch communication paths, with the second UE, from the infrastructure path to a direct wireless communication path to the second UE, the switching being performed transparently to an application layer process that is executing at the UE and that is communicating with the second UE.

The UE may replace, for a packet that is to be transmitted over the direct wireless communication path to the second UE, a source address field of the packet with a public-facing address of the UE in the infrastructure path; encapsulate the packet with source and destination address fields corresponding to the UE and the second UE, respectively, through the direct wireless communication path; and transmit the encapsulated packet over the direct wireless communication path. The UE may further decapsulate packets received over the direct wireless communication path from the second UE, the decapsulation including replacing destination address fields of the packets with a private address of the communication device in the infrastructure path; and provide the decapsulated packets to an application layer of the communication device.

In another implementation, a communication device may include means for determining a public-facing address corresponding to the infrastructure path of the communication device; means for transmitting, over the direct mode communication path to a second communication device, the public-facing address; and means for receiving, over the infrastructure path, an encapsulated packet from the second communication device. The communication device may further include means for decapsulating the received packet to obtain a packet that includes addressing information corresponding to the direct mode communication path; and means for providing the decapsulated packet to an application layer of the communication device.

Figure 2:
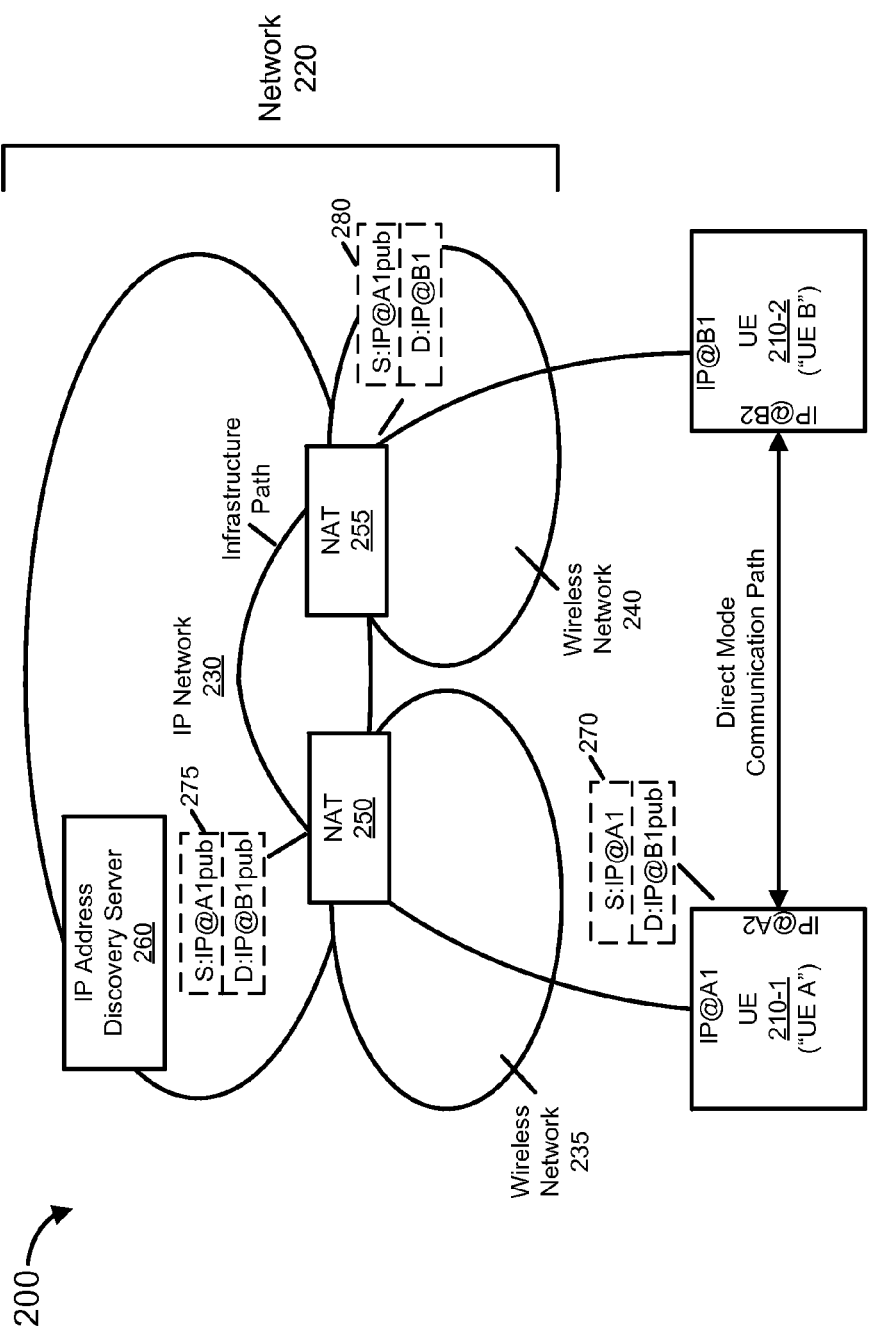
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more UEs 210-1 and 210-2 (sometimes referred to collectively herein as "UEs 210" or individually as "UE 210") and network 220 to provide network connectivity to UEs 210 and/or with other networks.

UEs 210 may include portable computing and communication devices, such as personal digital assistants (PDAs), smart phones, cellular phones, laptop computers with connectivity to a cellular wireless network, tablet computers, etc. UEs 210 may also include non-portable computing devices, such as desktop computers, consumer or business appliances, or other devices that have the ability to connect to network 220. UEs 210 may connect, through a radio link, to network 220. UEs 210 may also connect directly to one another using a direct mode communication path (e.g., via direct mode communication that does not use network 220).

As illustrated, UE 210-1 may be associated with two IP addresses: "IP@A1", which may include the IP address that is associated with a packet flow though the infrastructure path (e.g., through network 220) and "IP@A2", which may include the IP address that is associated with a packet flow over the direct mode communication path. As used herein, the term "IP address" or "address" may refer to an IPv4 or IPv6 address value and a port number. A computing device may include a number of logical port addresses (e.g., a port address may be a two-octet number, giving 65536 potential port numbers). Packets for a particular application (e.g., video application, web browsing application, etc.) may be addressed to the IPv4 or IPv6 address of the destination computing device and a specific port number. Using port numbers in network addresses may allow multiple applications, executing at a single computing device, to simultaneously share the same IP address. The notation "IP@Value" may be used herein to represent both IP addresses and port values. In practice, an IP address, such as an IPv4 address, and a corresponding port number may include a four-octet IP address and a two-octet port value (e.g., represented as 192.168.10.45:82, which may refer to port 82 at the IP address 192.168.10.45).

UEs 210 that are in the vicinity of one another (e.g., within direct radio range of one another when using radio transceivers of UEs 210) may discover and communicate with one another using direct mode communication paths. For example, a number of UEs 210 may form an ad hoc network with one another using direct mode communications. In some situations, not all UEs 210 in the ad hoc network may be directly connected with one another. That is, some of the UEs 210 may act as relay nodes in the ad hoc network to thereby expand coverage of the ad hoc network beyond the radio range of a single UE. The term "direct mode communication path" may refer to direct UE to UE wireless communications or communications that are relayed though an ad hoc network of UEs (e.g., without using the infrastructure path).

Network 220 may include one or more networks that provide network connectivity to UEs 210. As illustrated, network 220 may include IP network 230 and wireless networks 235 and 240. IP network 230 may represent, for example a wide area network (WAN), such as the Internet (or other network or combination of networks) that provides packet-based network connectivity. Wireless networks 235 and 240 may include wireless access and/or wireless core networks that provide wireless connectivity to UEs 210. Wireless networks 235 and 240 may represent, for example, cellular wireless networks that are implemented based on the Long Term Evolution (LTE) and/or Evolved Packet System (EPS) standards. Each of wireless networks 235 and 240 may correspond to, for example, wireless networks provided by different wireless service providers. Alternatively or additionally, wireless networks 235 and 240 may correspond to different sections or sub-networks that are provided by the same service provider. Although two wireless networks 235 and 240 and one IP network 230 are illustrated in FIG. 2, additional or fewer of each of networks 230, 235, and 240 may potentially be implemented.

Network 220 may include a number of network devices, such as routers, switches, gateways, and/or other control or data bearing network elements. As particularly illustrated in FIG. 2, network 220 may include NAT server 250 (associated with wireless network 235), NAT server 255 (associated with wireless network 240), and IP address discovery server 260.

NAT servers 250 and 255 may include devices that perform network address translation on packets. In one implementation, NAT servers 250 and 255 may implement functionality that is part of a Packet Data Network Gateway (PGW) device. In this situation, NAT servers 250 and 255 may provide network address translation services for packets entering/leaving wireless networks 235 and 240, respectively. In general, network address translation may refer to the process of modifying IP address information in IP headers while a packet is in transit. For example, one type of network address translation may provide a one-to-one translation of IP addresses and port values.

An example of network address translation is illustrated in FIG. 2 for an example packet transmitted from UE A to UE B over the infrastructure path. Due to network address translation by NAT server 255, the public-facing IP address of UE B (e.g., the IP address seen by devices external to wireless network 240), instead of being IP@B1, may be IP@B1pub. Similarly, due to network address translation by NAT server 250, the public-facing IP address of UE A, instead of being IP@A1, may be IP@A1pub. As illustrated in FIG. 2, a packet being transmitted by UE A to UE B may initially include the source address IP@A1 and the destination address of IP@B1pub (packet header 270). After traversing NAT server 250, the packet may include the source address IP@A1pub and the destination address IP@B1pub (packet header 275). After traversing NAT server 255, the packet may include the source address IP@A1pub and the destination address IP@B1 (packet header 280). The packet may then be delivered to UE B.

IP address discovery server 260 may include one or more devices designed to assist devices, such as UEs 210, in determining the public-facing IP addresses of the devices. IP address discovery server 260 may respond to requests from UEs 210 for the public-facing IP address of the UE. For example, in situations in which IP address discovery server 260 is located in IP network 230, the request, when it reaches IP address discovery server 260, may have been translated so that the public-facing IP address of the UE corresponds to the source address of the request. IP address discovery server 260 may then transmit the public-facing address back to the UE.

Although illustrated as part of IP network 230, in practice, IP address discovery server 260 may alternatively be implemented within wireless networks 235/240, or as functionality that is associated with NAT servers 250/255. In one implementation, IP address discovery server 260 may include a service implemented using the Port Control Protocol (PCP). The PCP may allow UEs 210 to discover the public IP address and port value used by NAT server 250 or 255 for a particular packet flow. The PCP may be implemented as a service within NAT 250/255. Alternatively or additionally, other mechanisms, such as the Session Traversal Utilities for NAT (STUN) protocol or Traversal Using Relays around NAT (TURN) protocol may be used to implement the functionality of IP address discovery server 260.

Although referred to as "servers," NAT server 250, NAT server 255, and IP address discovery server 260 may correspond to a traditional server, a service implemented in a network device that implements other functionality, a cluster of blade or rack-mounted servers, or another implementation that provides services and/or data storage.

Figure 3:
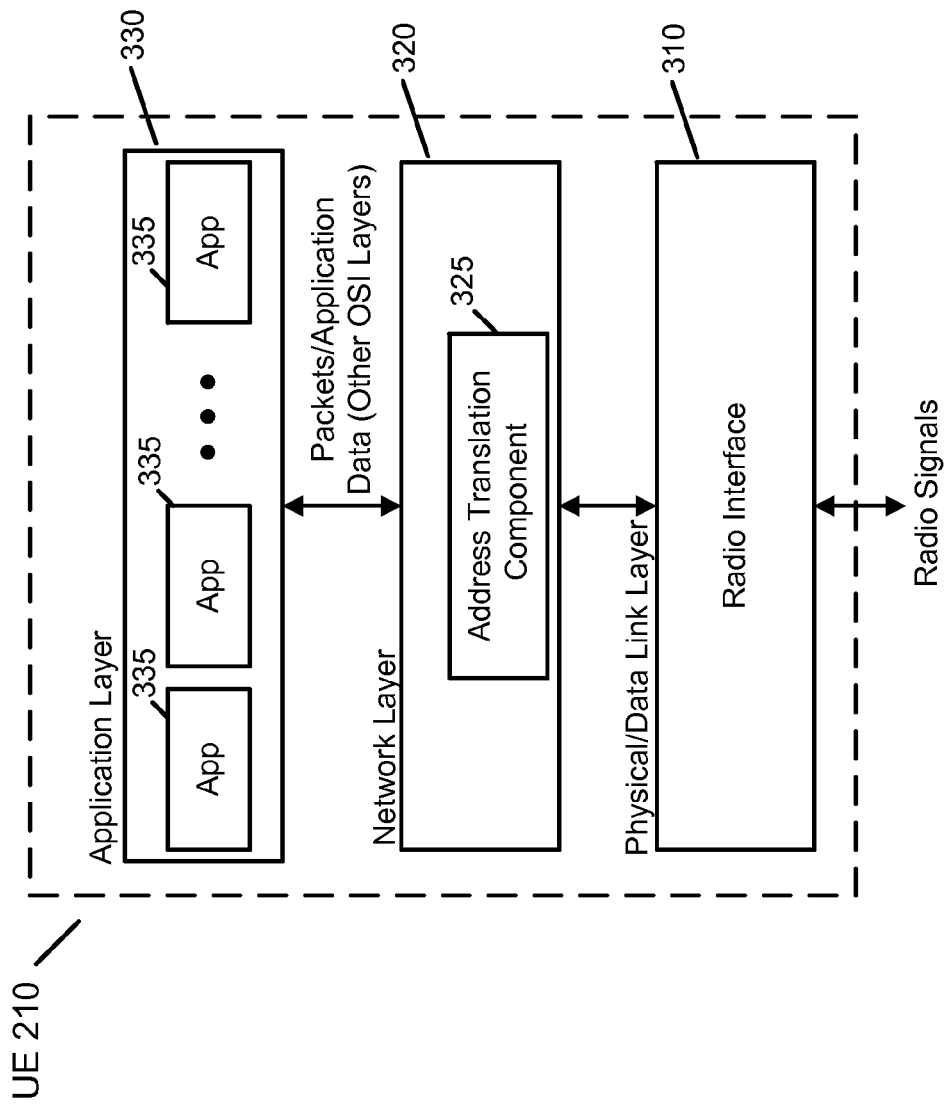
FIG. 3 is a diagram conceptually illustrating components of user equipment (UE) illustrated in FIG. 2.

FIG. 3 is a diagram conceptually illustrating components of UE 210. UE 210 may include functionality that can be conceptualized into functionality of the Open Systems Interconnection (OSI) model, including a radio interface 310 (e.g., functionality at the physical layer/data link layer), network layer 320, and application layer 330.

Radio interface 310 may include radio transceivers, antennas, and/or other logic to implement wireless radio communications for UE 210. In some implementations, radio interface 310 may include logic to connect via different wireless radio standards (e.g., radio circuitry to implement an IEEE 802.11-based radio interface and radio circuitry to implement an interface to a cellular network). Radio interface 310 may receive and output radio signals. Radio interface 310 may also provide other functionality relating to the operation of the physical layer and data link layer.

Network layer 320 may generally include logic to handle packet forwarding and routing. Network layer 320 may include address translation component 325. Address translation component 325 may perform address translation of IP addresses and port values for packet flows that are transmitted between UEs as part of direct mode communication. The address translation may enable session continuity between applications when switching between the infrastructure path and the direct mode communication path. The operation of address translation component 325 will be described in more detail below.

Application layer 330 may include one or more applications 335 that may communicate with other UEs 210 (or other devices) using process-to-process connections that may be based on IP addresses and port values. Applications 335 may include communication applications (e.g., voice or video call applications), file transfer applications, or other applications. From the perspective of an application 335, packet flows with other applications (e.g., at another UE) may be disrupted if the IP address or port number associated with the packet flow changes.

Figure 4:
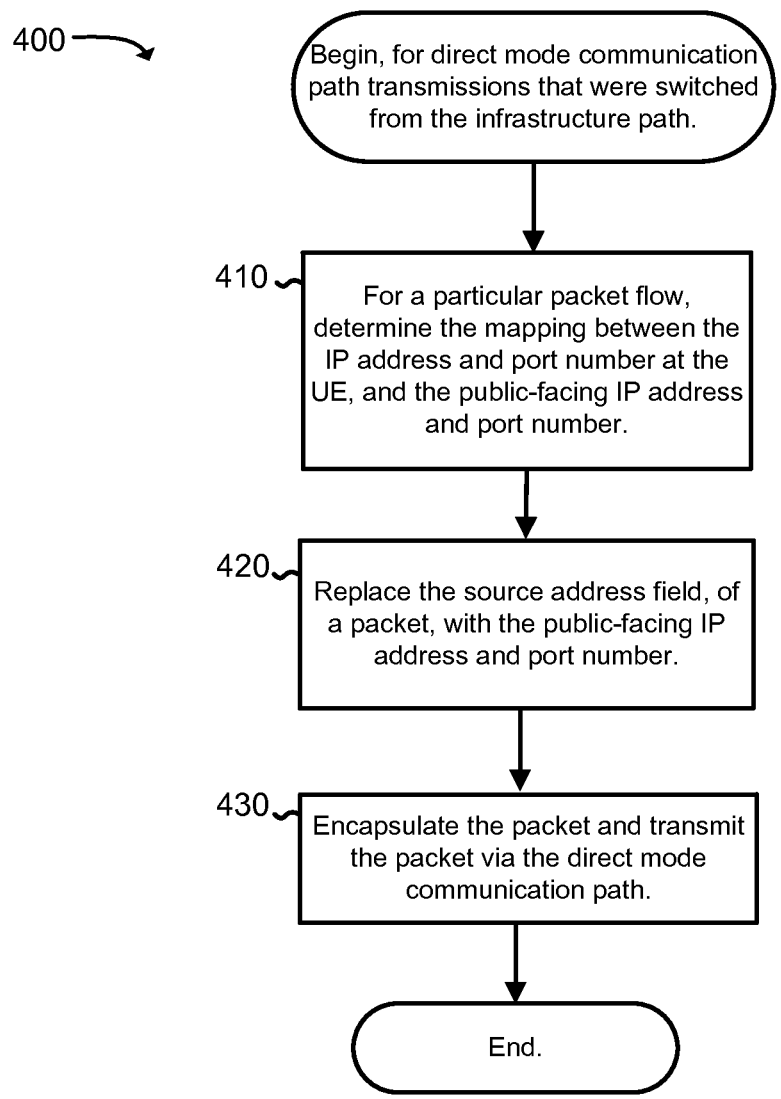
FIG. 4 is flow chart illustrating an example process for performing address translation at a UE with respect to outgoing packets.

FIG. 4 is flow chart illustrating an example process 400 for performing address translation at a UE 210 with respect to outgoing packets (packets being transmitted by the UE). Process 400 may be performed by, for example, address translation component 325 of UE 210. Process 400 may be performed for packets, in a packet flow that were originally transmitted via the infrastructure path, but that were switched to being transmitted via the direct mode communication path.

Process 400 may include determining, for a particular packet flow, the mapping between the IP address and port number at UE 210 (the private IP address and port number of UE 210) and the public-facing IP address and port number (block 410). The particular packet flow may include data that is generated by an application at UE 210. As mentioned, the public-facing IP address and port number may be the IP address and port number that is assigned by a network device, such as one of NAT servers 250 and 255. In one implementation, the mapping may be determined via a query to IP address discovery server 260. In the example of FIG. 2, for instance, the private IP address and port of UE A may be IP@A1. Through IP address discovery server 260, UE A may determine that the corresponding public-facing IP address and port of UE A is IP@A1pub. For situations in which UE 210 is not located behind a NAT, the public-facing IP address and port number may be the same as the private IP address and port number of UE 210.

Process 400 may further include replacing the source address field of a packet with the public-facing IP address and port number (block 420). In this manner, the packet, when received by the receiving UE, will appear, from the perspective of the receiving UE, to be a packet in the packet flow that was transmitted over the infrastructure path.

Process 400 may further include encapsulating the packet and transmitting the packet via the direct mode communication path (block 430). For example, the data of the packet may be wirelessly transmitted by radio interface 310 using the direct mode communication path. In one implementation, the direct mode communication path may be implemented as a tunnel that encapsulates the packet based on the direct mode communication path addresses (e.g., in the example of FIG. 2, IP@A2 and IP@B2).

Figure 5:
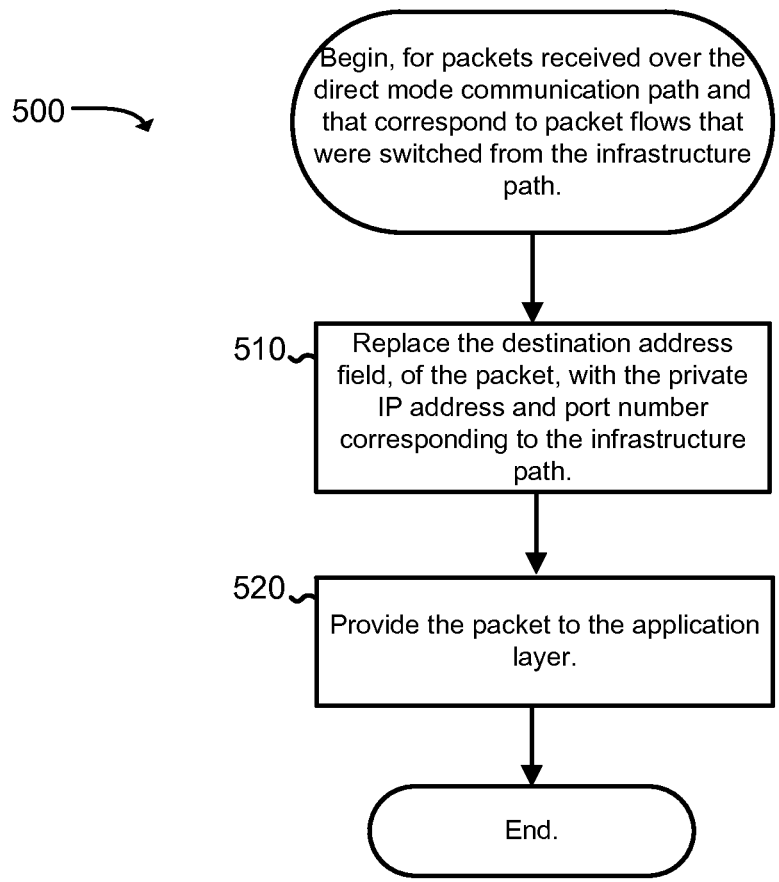
FIG. 5 is flow chart illustrating an example process for performing address translation at a UE with respect to incoming packets.

FIG. 5 is flow chart illustrating an example process 500 for performing address translation at a UE 210 with respect to incoming packets (packets being received by the UE). Process 500 may be performed by, for example, address translation component 325. Process 500 may be performed for packets, in a packet flow that was originally received via the infrastructure path, but that was switched to being transmitted via the direct mode communication path.

Process 500 may include replacing the destination address field of a packet with the private IP address and port number of the receiving UE (block 510). In other words, the destination address field may be modified to include the IP address of the UE on the infrastructure path and the port of the packet flow on the infrastructure path.

Process 500 may further include providing the packet to the application layer (block 520). Because of the address translation by the transmitting UE (e.g., as illustrated in FIG. 4) and by the receiving UE (block 510), the received packet may appear, from the perspective of the application layer at the receiving UE, to be a packet that belongs to the packet flow that was transmitted over the infrastructure path. Session continuity, corresponding to the packet flow, may thus be maintained.

Figure 6:
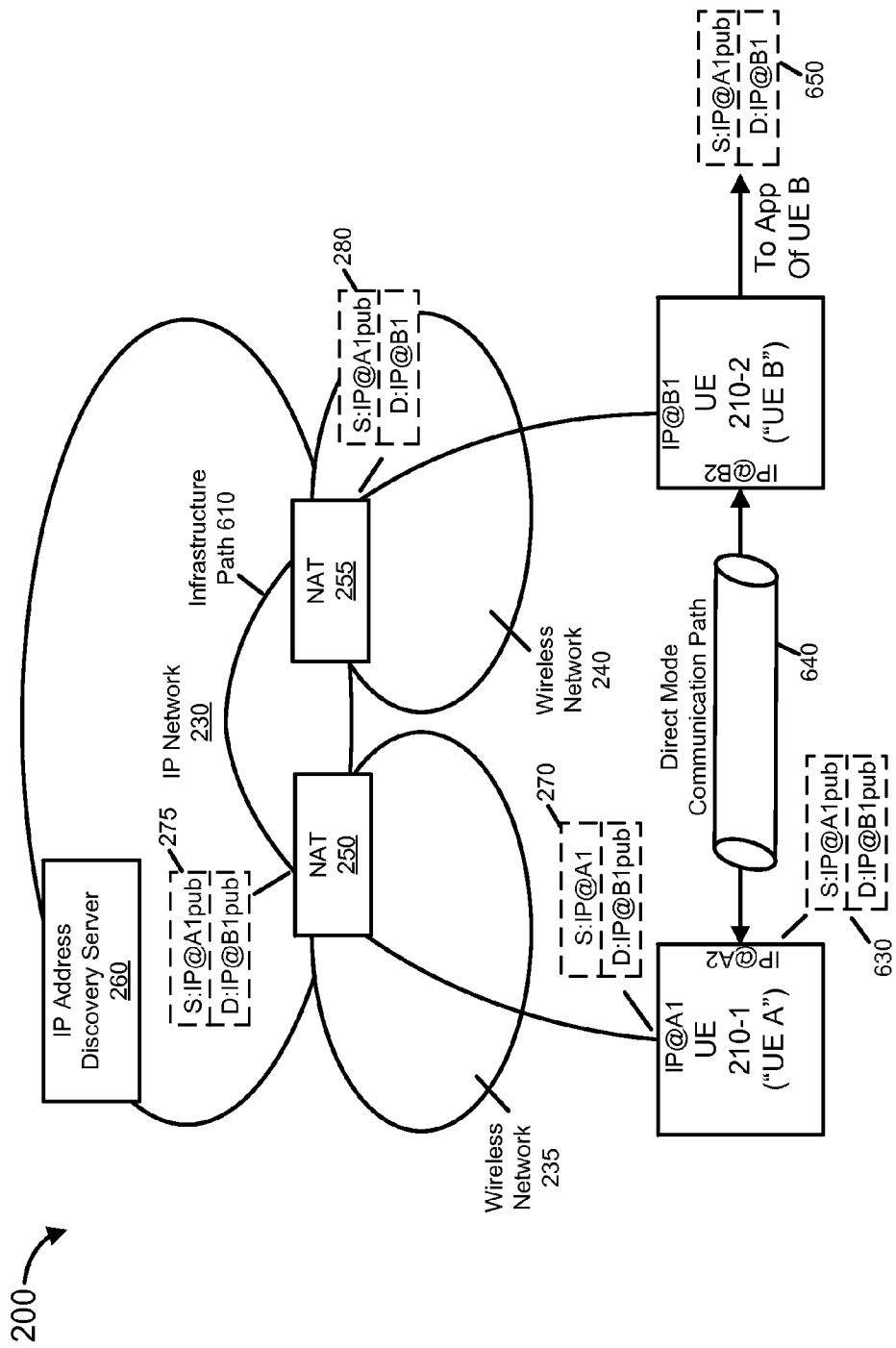
FIG. 6 is a diagram illustrating an example of address translation for packet flows.

FIG. 6 is a diagram illustrating, in the context of environment 200, an example of address translation for packet flows, performed pursuant to the processes discussed above with respect to FIGS. 4 and 5, in the direct mode communication path. Assume that an application at UE A is communicating with an application at UE B via infrastructure path 610. The packet flow corresponding to the communication between the applications at UE A and UE B may, depending on address translation performed by NAT servers 250 and 255, include various source and destination IP addresses (and port numbers). For example, as discussed previously, a packet transmitted by UE A on the infrastructure path may initially include the source address IP@A1 and the destination address IP@B1pub (packet header 270). After traversing NAT server 250, the packet may include the source address IP@A1pub and the destination address IP@B1pub (packet header 275). After traversing NAT server 255, the packet may include the source address IP@A1pub and the destination address IP@B1 (packet header 280).

At some point, UE A and UE B may establish the direct mode communication path. At this point, when transmitting a packet in the packet flow, address translation component 325 of UE A may modify the source address for the packet to replace IP@A1 with the public-facing address of UE A (e.g., with IP@A1pub), illustrated as packet header 630. In packet header 630, the source address may be IP@A1pub and the destination address may be IP@B1pub.

The packet may then be transmitted over the direct mode communication path. In one implementation, the direct communication path may be implemented as a tunnel 640 in which the original source and destination addresses (e.g., IP@A1pub and IP@B1pub) are encapsulated in a packet that is outwardly addressed based on the direct mode communication path addresses (e.g., IP@A2 and IP@B2).

UE B may receive the packet and remove the encapsulation to obtain a packet with the source address IP@A1pub and the destination address IP@B1pub. Address translation component 325 of UE B may modify the destination address for the packet to replace IP@B1pub with the private address of UE B relative to the infrastructure (IP@B1), illustrated as packet header 650. The packet with source address IP@A1pub and the destination address IP@B1 may be provided to the application at UE B (or to application layer processing at UE B).

In some implementations, instead of address translation being performed by a transmitting UE 210 (e.g., UE A) on the source address and address translation being performed by a receiving UE 210 (e.g., UE B) on the destination address, UE A and UE B may exchange the public and private address and port mappings, such as via the direct communication path, and then either the transmitting UE or the receiving UE may manipulate both the source and destination addresses to perform the address translation.

In the description above, session continuity was described in the context of continuity in switching from the infrastructure path to the direct mode communication path. In some implementations, it may be desirable to maintain session continuity when switching from the direct mode communication path to the infrastructure path.

Figure 7:
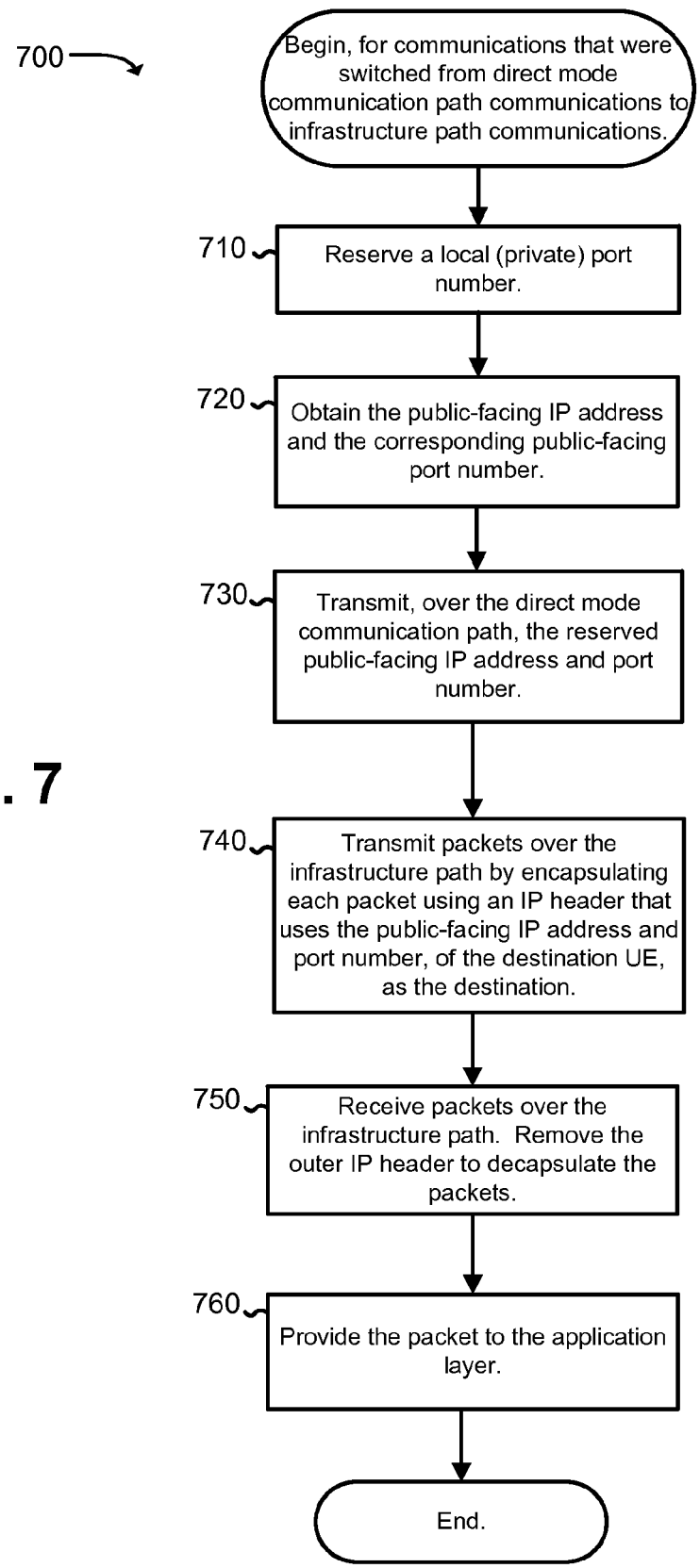
FIG. 7 is flow chart illustrating an example process for maintaining session continuity for an application when switching from the direct mode communication path to the infrastructure path.

FIG. 7 is a flow chart illustrating an example process 700 for maintaining session continuity for an application when switching from the direct mode communication path to the infrastructure path. Process 700 may be performed by, for example, a UE 210. In the context of communications between two UEs (e.g., UE A and UE B), process 700 may be performed by each of the two UEs for packets in a packet flow that were switched from the direct mode communication path to the infrastructure path.

Process 700 may include reserving a local (private) port number (block 710). The private port number may be a port that will be used to transmit the packet flow, corresponding to the application, over the infrastructure path. For example, from the perspective of UE A (FIG. 2 or FIG. 6), the private port number may be a port associated with IP@A1.

Process 700 may further include obtaining the public-facing IP address and the corresponding public-facing port number (block 720). The public-facing IP address and port number may be the IP address and port number assigned by one of NAT servers 250/255. In one implementation, the mapping may be determined via a query to IP address discovery server 260.

Process 700 may further include transmitting, over the direct mode communication path, the obtained public-facing IP address and port number (block 730). For example, two communicating UEs, UE A and UE B, may exchange, using the direct mode communication path, their public-facing IP addresses and port numbers that were obtained in block 720.

Process 700 may further include transmitting packets for the packet flow over the infrastructure path by encapsulating each packet using an IP header that includes, as the destination address, the public-facing IP address and port number of the other UE that is involved in the communication (block 740). The public-facing IP address and port number of the other UE may have been received from the other UE over the direct mode communication path (e.g., pursuant to the other UE performing block 740). Each transmitted packet may be routed to the destination UE over the infrastructure path, in which network address translation, such as by NAT servers 250 and 255, may be performed.

Process 700 may further include receiving packets over the infrastructure path (block 750). The outer IP header of the packets may be removed to decapsulate the packets (block 750). After decapsulation, the packet may include an IP header in which the source and destination address match the addresses corresponding to the direct mode communication path (e.g., IP@A2 and IP@B2).

Process 700 may include providing the packet to the application layer (or application) (block 760). The packet, from the perspective of application layer at the receiving UE, may appear to be a packet that belongs to the packet flow that was transmitted over the direct mode communication path. From the perspective of the application layer, session continuity, corresponding to the packet flow, may thus be maintained.

Figure 8:
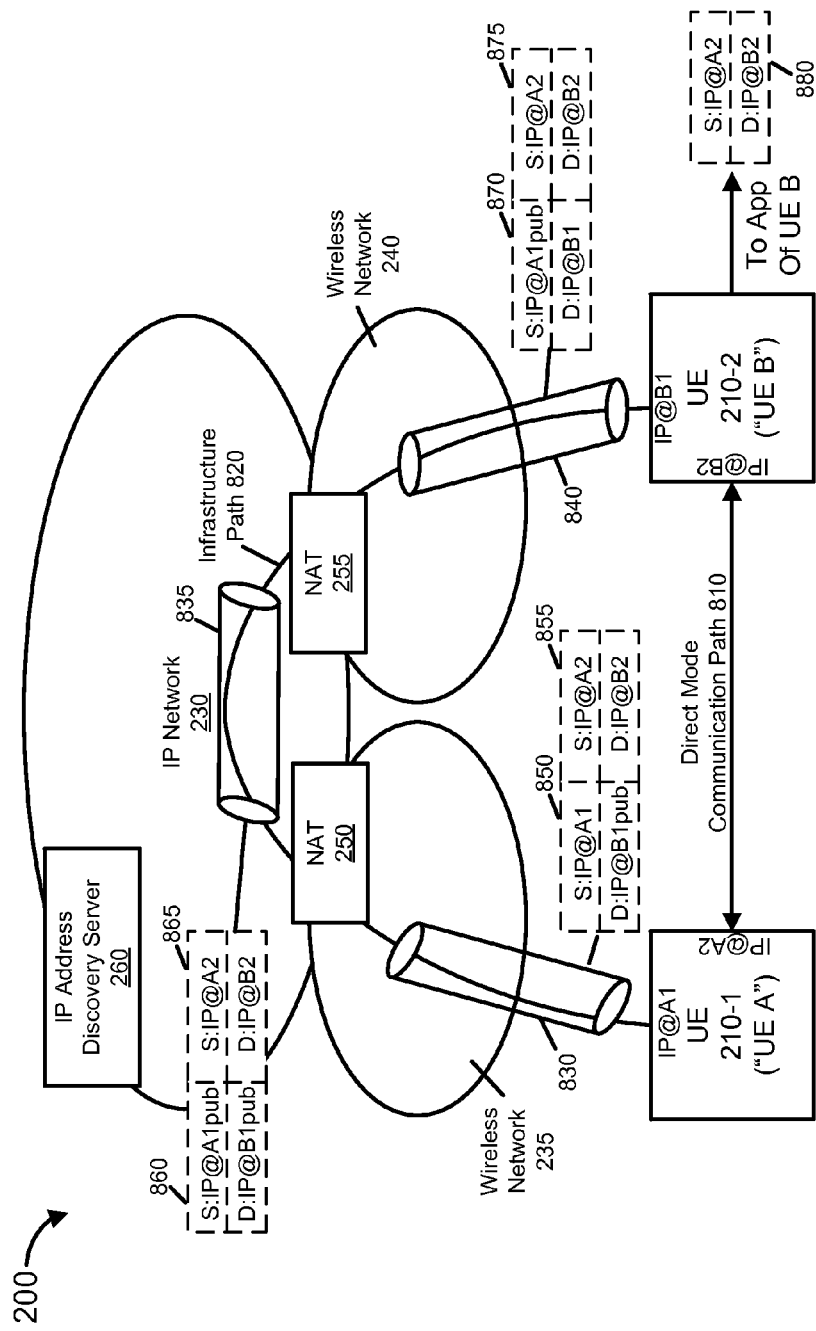
FIG. 8 is a diagram illustrating the maintaining of session continuity for an application when switching from a direct mode communication path to an infrastructure path.

FIG. 8 is a diagram illustrating, in the context of environment 200, maintaining session continuity for an application when switching from a direct mode communication path to an infrastructure path. Assume that an application, executing at UE A, is communicating with an application at UE B via the direct mode communication path. At some point, UE A and UE B may switch from the direct mode communication path to the infrastructure path. UE A and UE B may obtain their own respective public-facing IP addresses and port numbers (e.g., IP@A1pub and IP@B1pub, respectively), such as by querying IP address discovery server 260 (FIG. 7, block 720). UE A may transmit, via the direct mode communication path, the public-facing IP address and port number of UE A (e.g., IP@A1pub) to UE B (FIG. 7, block 730). Similarly, UE B may transmit, via the direct mode communication path, the public-facing IP address and port number of UE B (e.g., IP@B1pub) to UE A.

UEs A and B may use the exchanged public-facing IP addresses and port numbers to communicate with each other over the infrastructure path. For example, UE A may transmit a packet to UE B by encapsulating the packet with an IP header that includes the public-facing IP address and port number of UE B. The encapsulated packet may be transmitted from UE A to NAT server 250 (tunnel 830), from NAT server 250 to NAT server 255 (tunnel 835), and from NAT server 255 to UE B (tunnel 840). As part of the routing of the packet through the infrastructure path, NAT servers 250 and 255 may perform network address translation on the packets. As illustrated in FIG. 8, outer IP header 850 of the encapsulated packet, at the egress of UE A (e.g., through tunnel 830), may include source address IP@A1 and destination address IP@B1pub. Inner IP header 855 of the encapsulated packet may include source address IP@A2 and destination address IP@B2. Outer IP header 860 of the encapsulated packet, at the egress of NAT server 250 (e.g., through tunnel 835), may include source address IP@A1pub and destination address IP@B1pub. Inner IP header 865 of the encapsulated packet may be unchanged and include source address IP@A2 and destination address IP@B2. Outer IP header 870 of the encapsulated packet, at the egress of NAT server 255 (e.g., through tunnel 840), may include source address IP@A1pub and destination address IP@B1 Inner IP header 875 of the encapsulated packet may be unchanged and may include source address IP@A2 and destination address IP@B2.

UE B, when receiving the encapsulated packet over the infrastructure path, may remove the outer IP header to obtain a packet with a header, illustrated as packet header 880, that refers to the direct mode communication path (e.g., IP@A2 and IP@B2). The packet may be forwarded to the corresponding application (or to an application layer processing layer) at UE B. Packet header 880 may correspond to a header of a packet that is transmitted over direct mode communication path 810. In this manner, from the application perspective, session continuity during a switch from the direct mode communication path to the infrastructure path may be maintained.

In some implementations, instead of switching from the direct mode communication path to the infrastructure path using the techniques discussed with respect to FIGS. 7 and 8, a rendezvous server, residing in IP network 230, may be used. The address or identity of the rendezvous server may be agreed upon and/or exchanged by UEs 210 over the direct mode communication path. A correlation value or session identifier value (i.e., a value that the rendezvous server can use to determine that communications from the two UEs should be bridged) may also be agreed upon by UEs 210. UEs 210 may subsequently communicate using two half tunnels that are established with the rendezvous server.

Figure 9:
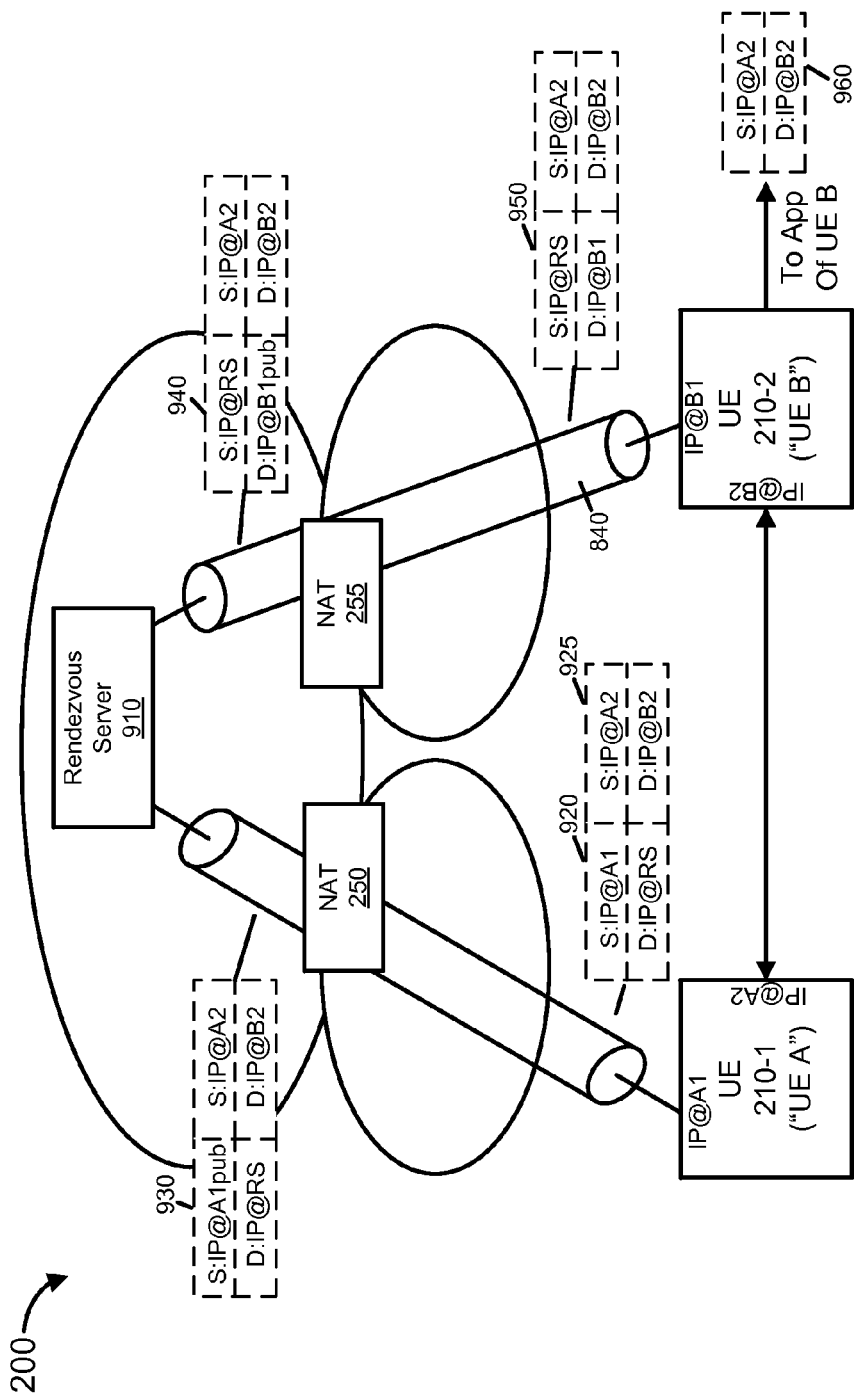
FIG. 9 is a diagram illustrating the use of rendezvous server to bridge a packet flow, between UEs, that has been switched from the direct mode communication path to the infrastructure path.

FIG. 9 is a diagram illustrating the use of rendezvous server 910 to bridge a packet flow between UEs 210 that has been switched from the direct mode communication path to the infrastructure path. As illustrated, rendezvous server 910 may include one or more computing devices that may act as an intermediary (bridge) in a packet flow between UE A and UE B. Each of UE A and UE B may establish a half-tunnel to rendezvous server 910. Rendezvous server 910 may link the two half-tunnels to create an end-to-end packet flow through the infrastructure path.

In FIG. 9, the addressing of packet headers by UE A and UE B may be similar to that described with respect to FIG. 8, except that packets sent by UEs 210 may have destination addresses that correspond to rendezvous server 910 instead of a UE 210. In FIG. 9, assume that rendezvous server 910 is associated with the IP address and port number "IP@RS." UE A may transmit a packet to UE B by encapsulating the packet with an outer IP header 920 that may include source address IP@A1 and destination address IP@RS. Inner IP header 925 of the encapsulated packet may include source address IP@A2 and destination address IP@B2. Inner IP header 925 may be unchanged throughout the transmission from UE A to UE B. After processing by NAT server 250, outer IP header 930 of the encapsulated packet may include source address IP@A1pub and destination address IP@RS. After reception by rendezvous server 910 and retransmission by rendezvous server 910, outer IP header 940 of the encapsulated packet may include source address IP@RS and destination address IP@B1pub. After processing by NAT server 255, outer IP header 950 of the encapsulated packet may include source address IP@RS and destination address IP@B1. UE B, when receiving the encapsulated packet over the infrastructure path, may remove the outer IP header to obtain a packet with a header, illustrated as packet header 960, that refers to the direct mode communication path (e.g., IP@A2 and IP@B2).

FIG. 10 is a diagram of example components of a device 1000. Each of the devices illustrated in FIGS. 1-3, 6, 8, and 9 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, a radio interfaces, or the like. In particular, communication interface 1060 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 4, 5, and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A communication device that maintains session continuity, for applications executing in the communication device, in switching from an infrastructure mode communication path to a direct mode communication path, the communication device comprising:
    a non-transitory computer readable medium containing program instructions; and
    one or more processors, to execute the program instructions to:
        determine a public-facing address corresponding to the infrastructure path of the communication device;
        replace, for a packet that is to be transmitted over the direct mode communication path to a second communication device, a source address field of the packet with the determined public-facing address;
        encapsulate the packet with source and destination address fields corresponding to the communication device and the second communication device, respectively, through the direct mode communication path; and
        transmit the encapsulated packet to the direct mode communication path.

2. The communication device of claim 1, wherein the one or more processors are further to execute the program instructions to:
    decapsulate packets received over the direct mode communication path from the second communication device, the decapsulation including replacing destination address fields of the packets with a private address of the communication device in the infrastructure path; and
    provide the decapsulated packets to an application layer of the communication device.

3. The communication device of claim 1, wherein the source address field of the packet that is to be transmitted over the direct mode communication path is initially created by the communication device as an address corresponding to the infrastructure path of the communication device.

4. The communication device of claim 1, wherein the replaced source address field of the packet includes a public-facing address that refers to a private address of the communication device in the infrastructure path.

5. The communication device of claim 1, wherein the public-facing address and the source address each include an Internet Protocol (IP) address and a port number.

6. The communication device of claim 1, wherein the one or more processors, when determining the public-facing address, are further to:
    query a Port Control Protocol (PCP) server, a Session Traversal Utilities for Network Address Translation (STUN) server, or a Traversal Using Relays around Network Address Translation (TURN) server.

7. The communication device of claim 1, wherein the direct mode communication path includes wireless communications based on Institute of Electrical and Electronics Engineers (IEEE) 802.11-based wireless communication standards or based on 3rd Generation Partnership Project (3GPP) standards.

8. The communication device of claim 7, wherein communications over the infrastructure mode communication path includes communications based on cellular wireless communication standards.

9. A communication device to maintain session continuity, for applications executing in the communication device, in switching from a direct mode communication path to an infrastructure communication path, the communication device including:
    a non-transitory computer readable medium containing program instructions; and
    one or more processors, to execute the program instructions to:
        determine a public-facing address corresponding to the infrastructure path of the communication device;
        transmit, over the direct mode communication path and to a second communication device, the public-facing address;
        receive, over the infrastructure path, an encapsulated packet from the second communication device;
        decapsulate the received encapsulated packet to obtain a packet that includes addressing information corresponding to the direct mode communication path; and
        provide the decapsulated packet to an application layer of the communication device.

10. The communication device of claim 9, wherein the one or more processors are further to execute the program instructions to:
    receive, from the second communication device and over the direct mode communication path, a public-facing address corresponding to the infrastructure communication path of the second communication device.

11. The communication device of claim 9, wherein the one or more processors are further to execute the program instructions to:
  encapsulate, by the communication device, packets that are to be delivered to the second communication device, the encapsulation being based on the public-facing address corresponding to the second communication device; and
  transmit, by the communication device and over the infrastructure path, the encapsulated packets.

12. The communication device of claim 9, wherein the public-facing address includes an Internet Protocol (IP) address and a port number.

13. The communication device of claim 9, wherein when determining the public-facing address, the one or more processors are further to:
  query a Port Control Protocol (PCP) server, a Session Traversal Utilities for Network Address Translation (STUN) server, or a Traversal Using Relays around Network Address Translation (TURN) server.

14. The communication device of claim 9, wherein the direct mode communication path includes wireless communications based on Institute of Electrical and Electronics Engineers (IEEE) 802.11-based wireless communication standards or based on 3rd Generation Partnership Project (3GPP) standards.

15. User equipment (UE) comprising:
  a memory to store instructions; and
  at least one processor to execute the instructions stored by the memory to:
    connect with a second UE, using a communication session formed over an infrastructure path; and
    switch communication paths, with the second UE, from the infrastructure path to a direct wireless communication path to the second UE, the switching being performed transparently to an application layer process that is executing at the UE and that is communicating with the second UE, wherein the at least one processor, when switching communication paths is to further execute the instructions stored by the memory to:
      replace, for a packet that is to be transmitted over the direct wireless communication path to the second UE, a source address field of the packet with a public-facing address of the UE in the infrastructure path;
      encapsulate the packet with source and destination address fields corresponding to the UE and the second UE, respectively, through the direct wireless communication path; and
      transmit the encapsulated packet over the direct wireless communication path.

16. The UE of claim 15, wherein the at least one processor is to further execute the instructions stored by the memory to:
  decapsulate packets received over the direct wireless communication path from the second UE, the decapsulation including replacing destination address fields of the packets with a private address of the communication device in the infrastructure path; and
  provide the decapsulated packets to an application layer of the communication device.

17. A method for maintaining session continuity, for applications executing in a communication device, in switching from an infrastructure mode communication path to a direct mode communication path, the method comprising:
  determining, by the communication device, a public-facing address corresponding to the infrastructure path of the communication device;
  replacing, by the communication device and for a packet that is to be transmitted over the direct mode communication path to a second communication device, a source address field of the packet with the determined public-facing address;
  encapsulating, by the communication device, the packet with source and destination address fields corresponding to the communication device and the second communication device, respectively, through the direct mode communication path; and
  transmitting the encapsulated packet to the direct mode communication path.

18. The method of claim 17, further comprising:
  decapsulating, by the communication device, packets received over the direct mode communication path from the second communication device, the decapsulation including replacing destination address fields of the packets with a private address of the communication device in the infrastructure path; and
  providing the decapsulated packets to an application layer of the communication device.

19. The method of claim 17, wherein the source address field of the packet that is to be transmitted over the direct mode communication path is initially created by the communication device as an address corresponding to the infrastructure path of the communication device.

20. The method of claim 17, wherein the replaced source address field of the packet includes a public-facing address that refers to a private address of the communication device in the infrastructure path.

21. The method of claim 17, wherein the public-facing address and the source address each include an Internet Protocol (IP) address and a port number.

22. The method of claim 17, wherein the determining the public-facing address includes:
  querying a Port Control Protocol (PCP) server, a Session Traversal Utilities for Network Address Translation (STUN) server, or a Traversal Using Relays around Network Address Translation (TURN) server.

23. The method of claim 17, wherein the direct mode communication path includes wireless communications based on Institute of Electrical and Electronics Engineers (IEEE) 802.11-based wireless communication standards or based on 3rd Generation Partnership Project (3GPP) standards.

24. The method of claim 23, wherein communications over the infrastructure mode communication path includes communications based on cellular wireless communication standards.

* * * * *